US008892360B2

(12) United States Patent
Otani

(10) Patent No.: US 8,892,360 B2
(45) Date of Patent: Nov. 18, 2014

(54) METHOD OF GENERATING A SUGGESTED NAVIGATION ROUTE BASED ON TOUCH INPUT RECEIVED FROM A USER AND RELATED PORTABLE ELECTRONIC DEVICE

(75) Inventor: Takuya Otani, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 295 days.

(21) Appl. No.: 13/615,486

(22) Filed: Sep. 13, 2012

(65) Prior Publication Data

US 2014/0074401 A1   Mar. 13, 2014

(51) Int. Cl.
G06F 19/00 (2011.01)
G01C 21/00 (2006.01)
G06F 17/30 (2006.01)

(52) U.S. Cl.
USPC ........... 701/467; 701/469; 701/487; 701/491; 701/526; 701/410; 701/533; 701/538; 345/418; 345/619; 345/661

(58) Field of Classification Search
USPC ......... 701/533, 532, 538, 408, 467, 468, 469, 701/487, 491, 526, 410; 345/418, 619, 661
See application file for complete search history.

(56) References Cited

U.S. PATENT DOCUMENTS

| 6,321,158 | B1* | 11/2001 | DeLorme et al. | 701/426 |
|---|---|---|---|---|
| 6,904,360 | B2* | 6/2005 | Pechatnikov et al. | 701/532 |
| 8,321,126 | B2* | 11/2012 | Mays | 701/428 |
| 2003/0182052 | A1* | 9/2003 | DeLorme et al. | 701/201 |
| 2007/0067104 | A1* | 3/2007 | Mays | 701/211 |
| 2008/0059055 | A1* | 3/2008 | Geelen et al. | 701/201 |
| 2010/0114471 | A1 | 5/2010 | Sugiyama | |
| 2011/0010241 | A1* | 1/2011 | Mays | 705/14.49 |
| 2011/0022308 | A1 | 1/2011 | Britton | |
| 2011/0145718 | A1* | 6/2011 | Ketola et al. | 715/739 |
| 2012/0013609 | A1* | 1/2012 | Reponen et al. | 345/419 |
| 2012/0221552 | A1* | 8/2012 | Reponen et al. | 707/722 |
| 2012/0254804 | A1* | 10/2012 | Sheha et al. | 715/834 |
| 2012/0323482 | A1 | 12/2012 | Wu | |

FOREIGN PATENT DOCUMENTS

| DE | 102 18 340 A1 | 11/2003 |
|---|---|---|
| EP | 2 557 397 A1 | 2/2013 |
| JP | 2002350163 A | 12/2002 |
| JP | 200428703 A | 1/2004 |
| TW | M388057 | 9/2010 |
| TW | 201139992 | 11/2011 |
| TW | 201217755 | 5/2012 |
| TW | 201309508 | 3/2013 |
| WO | 2011124272 A1 | 10/2011 |

* cited by examiner

*Primary Examiner* — Ronnie Mancho
(74) *Attorney, Agent, or Firm* — Winston Hsu; Scott Margo

(57) ABSTRACT

A method of generating a suggested navigation route with a portable electronic device includes presenting a map to a user on a touch-sensitive screen of the portable electronic device, and receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point. The method further includes generating the suggested navigation route by selecting streets for the suggested navigation route according to the preferred route in order to closely approximate the preferred route, presenting the suggested navigation route to the user on the touch-sensitive screen, and providing navigation assistance to the user for guiding the user along the suggested navigation route.

16 Claims, 11 Drawing Sheets

METHOD OF GENERATING A SUGGESTED NAVIGATION ROUTE BASED ON TOUCH INPUT RECEIVED FROM A USER AND RELATED PORTABLE ELECTRONIC DEVICE

BACKGROUND OF THE INVENTION

1. Field of the Invention

The invention relates to a method of generating a suggested navigation route on a portable electronic device, and more particularly, to a method of generating a suggested navigation route according to a path indicated by a user stroking a touch-sensitive screen of the portable electronic device.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

One useful feature of personal navigation devices is the ability to list nearby points of interest (POIs). In rural areas, points of interest may be spread out far from each other, and can easily be shown on the display of the personal navigation device. However, when traveling through cities or other areas where there are many points of interest in close proximity to one another, there can be tens of points of interest located very close together.

In a personal navigation device, providing the ability for the user of the personal navigation device to create a route is an important function. Typically, when a user wishes to create a route, the user decides a destination location of the route. In some instances, the user may also indicate a starting location for the route.

Two conventional ways of defining the destination location involve inputting the destination location using text input or inputting the destination location by pointing to a location on a map shown on a screen of the personal navigation device. In the first method involving text input, the user of the personal navigation device can use a keyboard to input an address of the destination location or to input a keyword to find a location. The second method of receiving touch input works so long as a display of the personal navigation device is a touch-sensitive screen.

Although these two conventional methods of defining the destination location do work to identify the destination location of a route, the user is only able to specify the destination location at the end of the route, and the user is not always able to create a customized route to the user's satisfaction. When determining a route based only on a given destination location, the personal navigation device may create a route that is a simple straight line from the current location of the personal navigation device to the destination location.

The prior art provides a few methods of customizing routes generated by the personal navigation device. Some personal navigation devices allow routes to be selected based on a chosen route type, such as the fastest route, the shortest route, the most economical route, etc. In this case, the route type selected by the user determines the route characteristics. However, once the route has been created, the user is unable to modify the details of the route.

Another prior art method of customizing routes involves setting multiple waypoints along the route. Although this gives the user a great deal of control over the generated route, this requires a great deal of time to be spent by the user in order to enter the multiple waypoints and to confirm that the generated route is correct.

Due to the drawbacks associated with each of the prior art input methods, there exists a need for a quick and convenient input method for a user to be able to enter a customized route while giving the user the ability to fine tune the generated route.

SUMMARY OF THE INVENTION

It is therefore one of the primary objectives of the claimed invention to provide a method of generating a suggested navigation route according to a path indicated by a user stroking a touch-sensitive screen of the portable electronic device.

According to an exemplary embodiment of the claimed invention, a method of generating a suggested navigation route with a portable electronic device is disclosed. The method includes presenting a map to a user on a touch-sensitive screen of the portable electronic device, and receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point. The method further includes generating the suggested navigation route by selecting streets for the suggested navigation route according to the preferred route in order to closely approximate the preferred route, presenting the suggested navigation route to the user on the touch-sensitive screen, and providing navigation assistance to the user for guiding the user along the suggested navigation route.

According to another exemplary embodiment of the claimed invention, a portable electronic device for generating a suggested navigation route based on touch input received from a user includes a touch-sensitive screen for presenting a map to the user and for receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point. The portable electronic device further includes routing software for generating the suggested navigation route by selecting streets for the suggested navigation route according to the preferred route in order to closely approximate the preferred route. The portable electronic device also includes a user interface for presenting the suggested navigation route to the user on the touch-sensitive screen and providing navigation assistance to the user for guiding the user along the suggested navigation route.

According to yet another exemplary embodiment of the claimed invention, a method of generating a suggested navigation route with a portable electronic device is disclosed. The method includes presenting a map to a user on a touch-sensitive screen of the portable electronic device, and receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point. The method further includes generating the suggested navigation route by selecting streets with higher product-moment correlation with respect to each segment of the preferred route. The product-moment correlation corresponding to each segment of the preferred route is calculated by dividing the preferred route into a plurality of vectors respectively corresponding to segments of the preferred route, the vectors sequentially located from the starting point to the ending point, and for each vector of the plurality of vectors, calculating a product-moment correlation for streets located near the corresponding segment of the preferred route, wherein the product-moment correlation value for a street closer in location to the vector and more similar in direction to the vector is higher than the product-moment correlation value for a street farther in location from the vector or more dissimilar in direction to the vector. The method further includes presenting the suggested navigation route to the user on the touch-sensitive screen, and providing navigation assistance to the user for guiding the user along the suggested navigation route.

It is an advantage that the present invention provides a simple, fast, and convenient input method for allowing a user to enter a customized route detailing not only the starting point and the ending point of a preferred route, but also the points along the preferred route located in between the starting point and the ending point. Moreover, after the suggested navigation route is created according to the user's preferred route, the user also has the ability to easily make fine tuning adjustments to the suggested navigation route.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
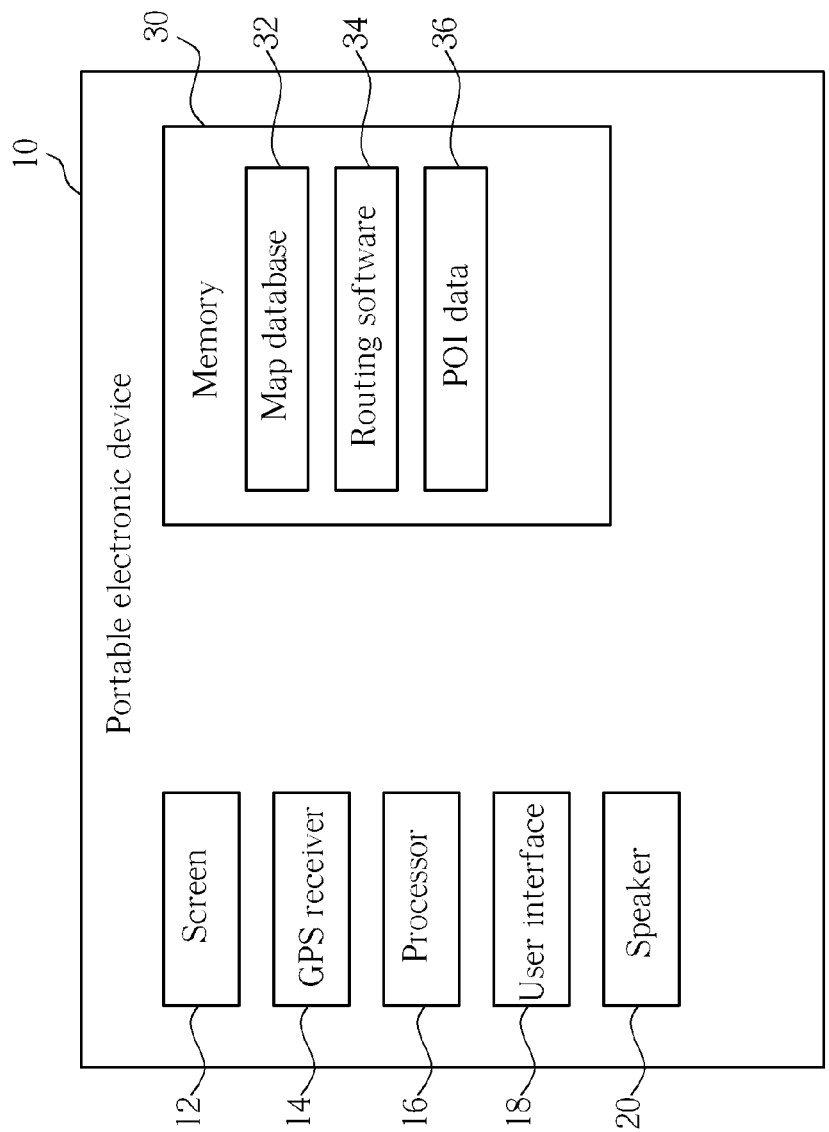
FIG. 1 is a block diagram of a portable electronic device according to the present invention.

Please refer to FIG. 1. FIG. 1 is a block diagram of a portable electronic device 10 according to the present invention. The portable electronic device 10 contains a touch-sensitive screen 12 for receiving touch input from a user, a Global Positioning System (GPS) receiver 14 for receiving the current coordinates of the portable electronic device 10, a processor 16 for controlling operation of the portable electronic device 10, a user interface 18, a speaker 20, and memory 30. The memory 30 is used to store a map database 32 containing map data and points of interest. The memory 30 also stores routing software 34 and point of interest data 36. The GPS receiver 14 receives GPS signals and indicates a current location of the portable electronic device 10. Please note that other satellite or terrestrial positing receiving devices besides the GPS receiver 14 could be used instead for receiving position signals.

Figure 2:
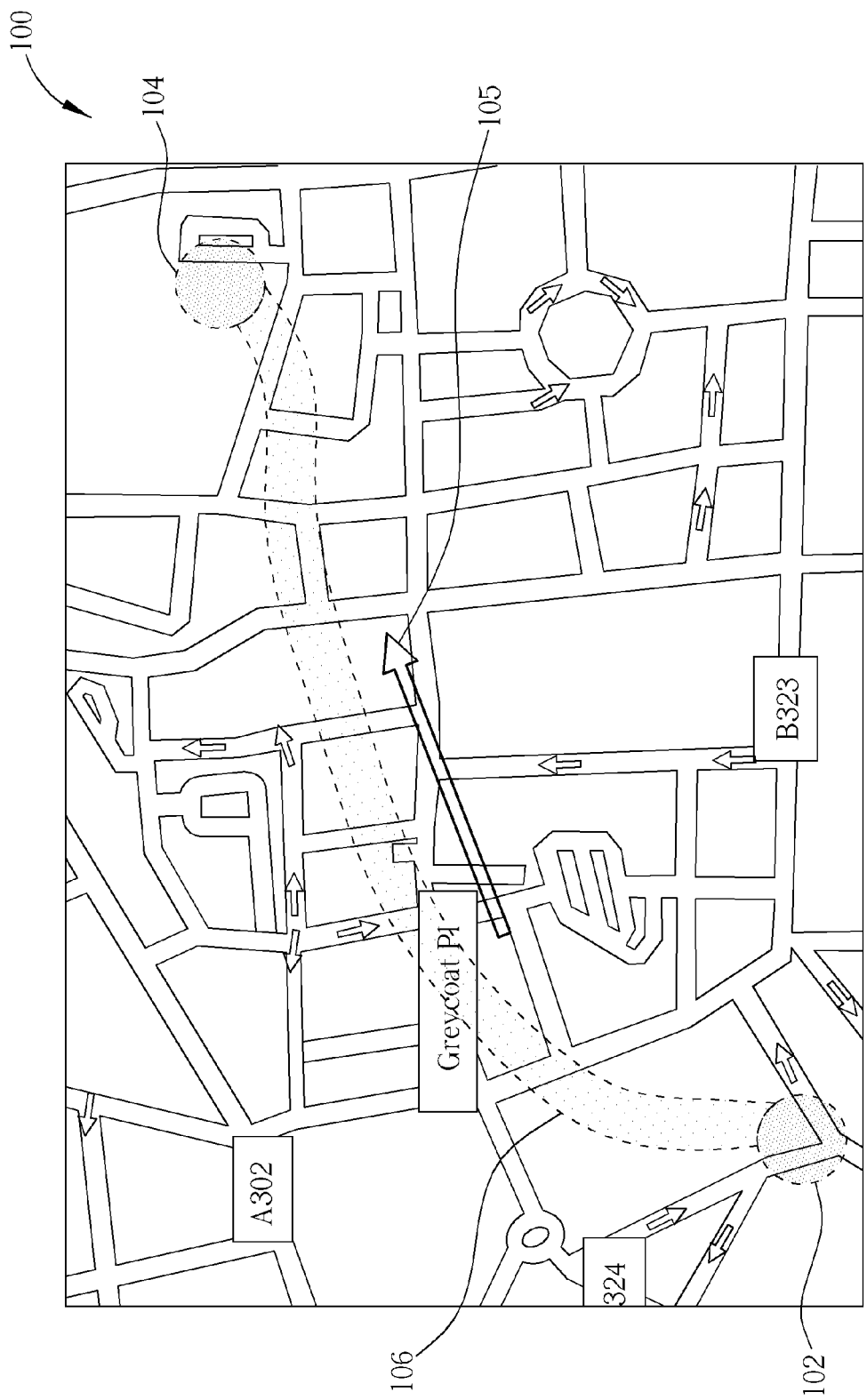
FIG. 2 illustrates a window displayed on the touch-sensitive screen for allowing a user to input a preferred route according to the present invention.

Please refer to FIG. 2. FIG. 2 illustrates a window 100 displayed on the touch-sensitive screen 12 for allowing a user to input a preferred route according to the present invention. Window 100 contains a map on which the user of the portable electronic device 10 can create a route to follow. When the user wishes to create a new route in the present invention, the user simply needs to stroke the touch-sensitive screen 12 by touching down on the touch-sensitive screen 12 at a starting point 102 and maintaining contact with the touch-sensitive screen 12 until releasing contact at a release location that corresponds to an ending point 104 in order to create a preferred route 106. The direction of the preferred route 106 is shown by arrow 105 on window 100.

Figure 3:
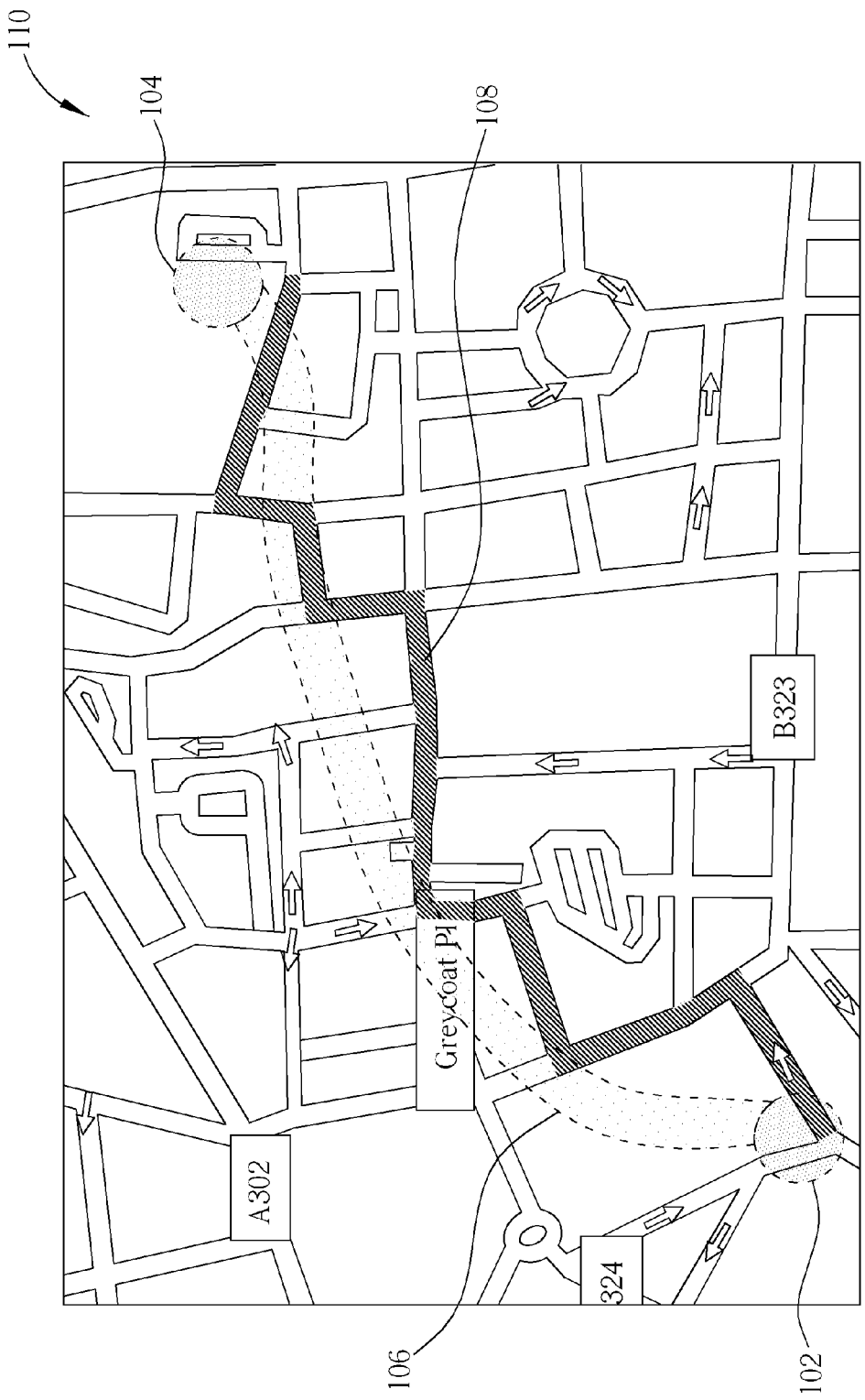
FIG. 3 illustrates a window showing generation of a suggested navigation route according to the preferred route entered by the user.

Please refer to FIG. 3. FIG. 3 illustrates a window 110 showing generation of a suggested navigation route 108 according to the preferred route 106 entered by the user. The suggested navigation route 108 is created not only by beginning at the starting point 102 and finishing at the ending point 104, but also by following the path of the intermediate points of the preferred route 106 as much as possible. Since streets will not always follow the exact path of the preferred route 106, the suggested navigation route 108 will be selected by using streets that most closely approximate the preferred route 106.

Figure 4:
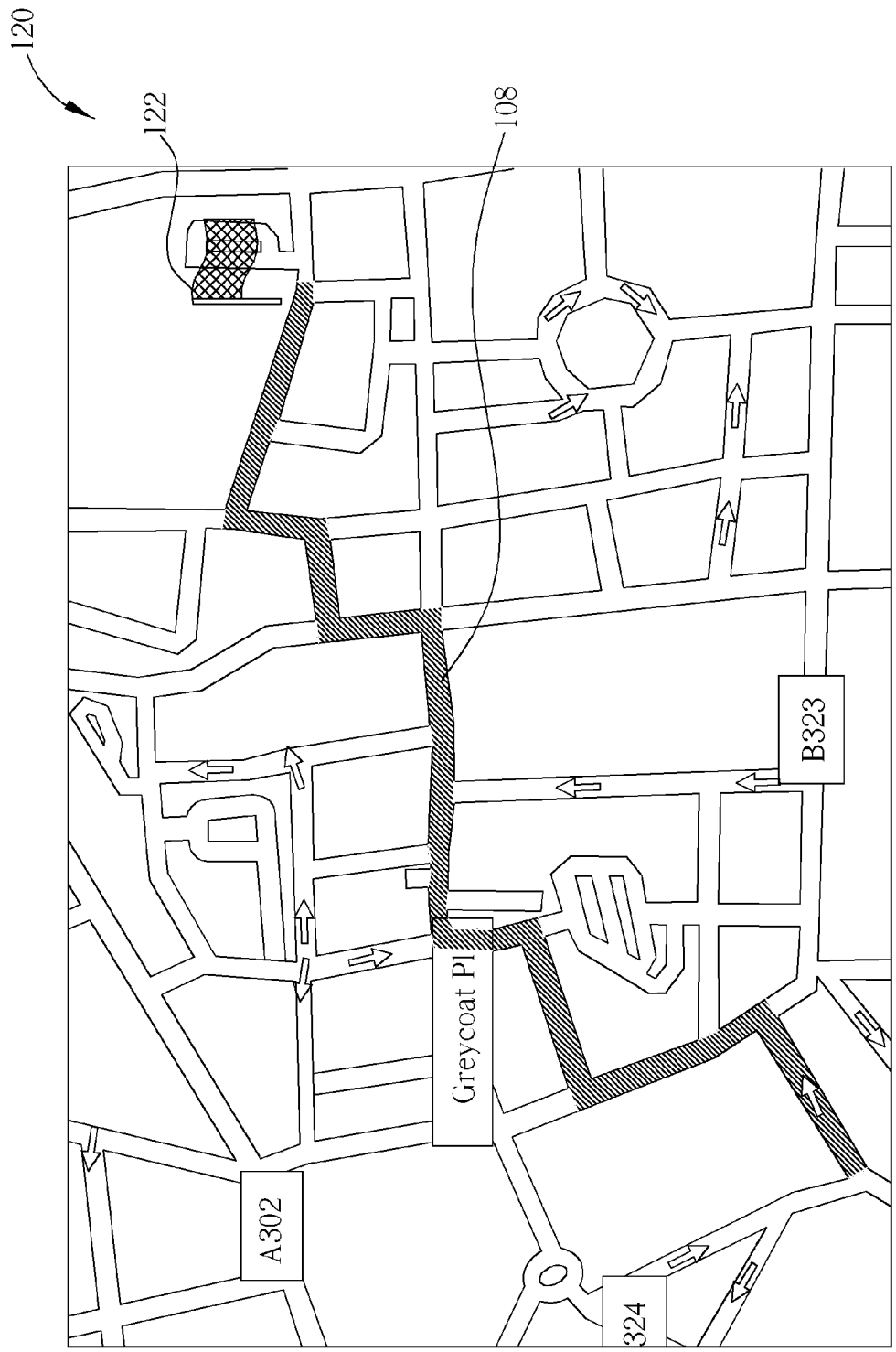
FIG. 4 illustrates a window showing the suggested navigation route after it has been created.

Please refer to FIG. 4. FIG. 4 illustrates a window 120 showing the suggested navigation route 108 after it has been created. A destination location 122, depicted by a checkered flag and corresponding to the ending point 104 shown in FIG. 2 and FIG. 3, indicates where the suggested navigation route 108 ends.

In the present invention, a suggested navigation route is generated using the starting point, the ending point, and the intermediate points. Therefore, it is possible for two different suggested navigation routes to have the same starting and ending points but still follow different paths due to the different intermediate points produced by a different stroked path made by the user.

Figure 5:
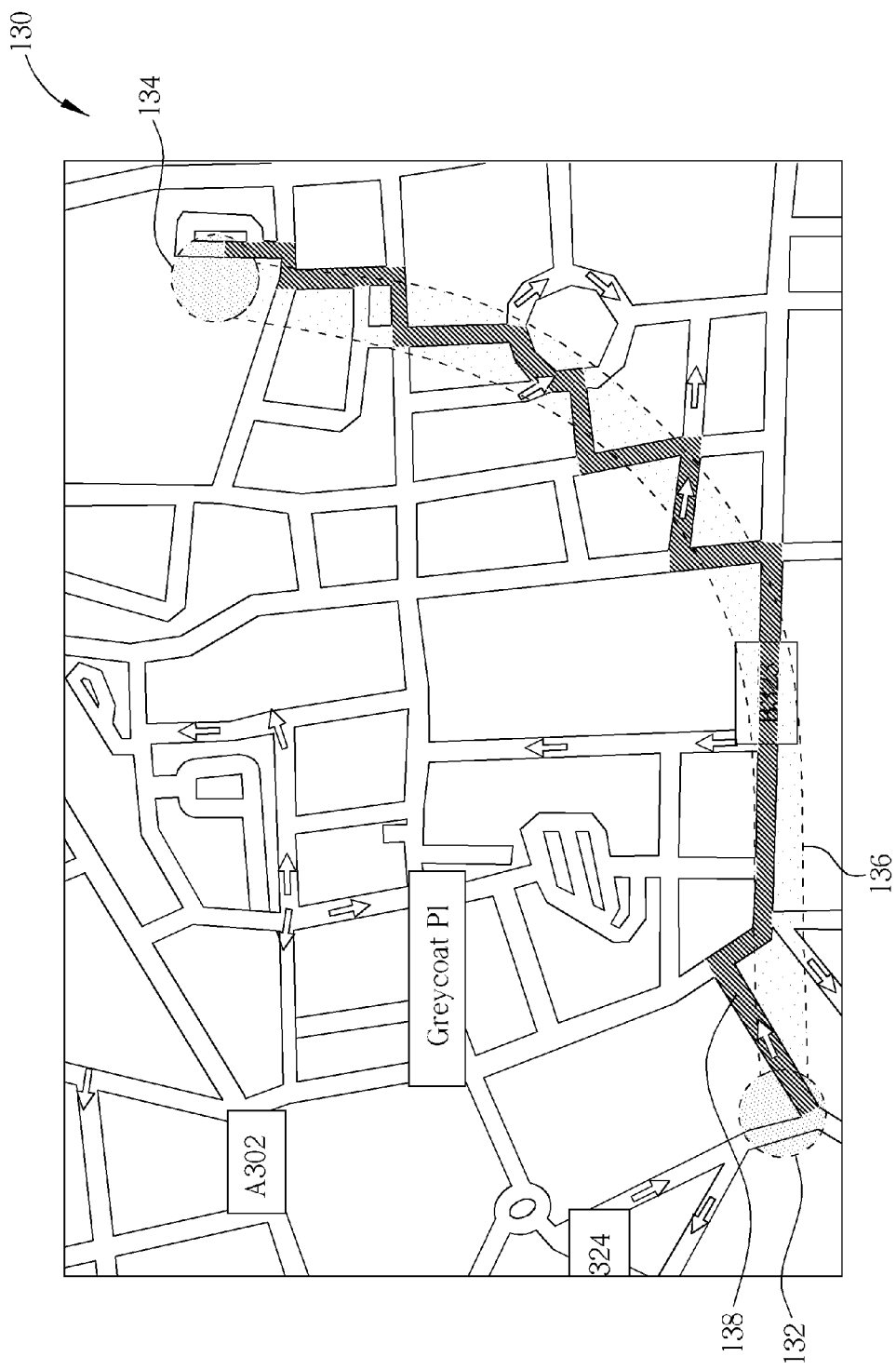
FIG. 5 illustrates a window displayed on the touch-sensitive screen for allowing a user to input another preferred route according to the present invention.

Please refer to FIG. 5. FIG. 5 illustrates a window 130 displayed on the touch-sensitive screen 12 for allowing a user to input another preferred route according to the present invention. User creates a preferred route 136 by touching down on the touch-sensitive screen 12 at a starting point 132 and maintaining contact with the touch-sensitive screen 12 until releasing contact at a release location that corresponds to an ending point 134. By comparing FIG. 5 to FIG. 3, it can be seen that the starting point 102 and the ending point 104 of preferred route 106 are located at the same positions as the starting point 132 and the ending point 134 of the preferred route 136. Nevertheless, since the intermediate points of the preferred route 106 and the preferred route 136 are different from one another, the corresponding suggested navigation route 108 and the suggested navigation route 138 are also different from one another. Therefore, the user of the portable electronic device 10 has a great deal of control over how the suggested navigation routes are created based on the path that the user strokes on the surface of the touch-sensitive screen 12.

Figure 6:
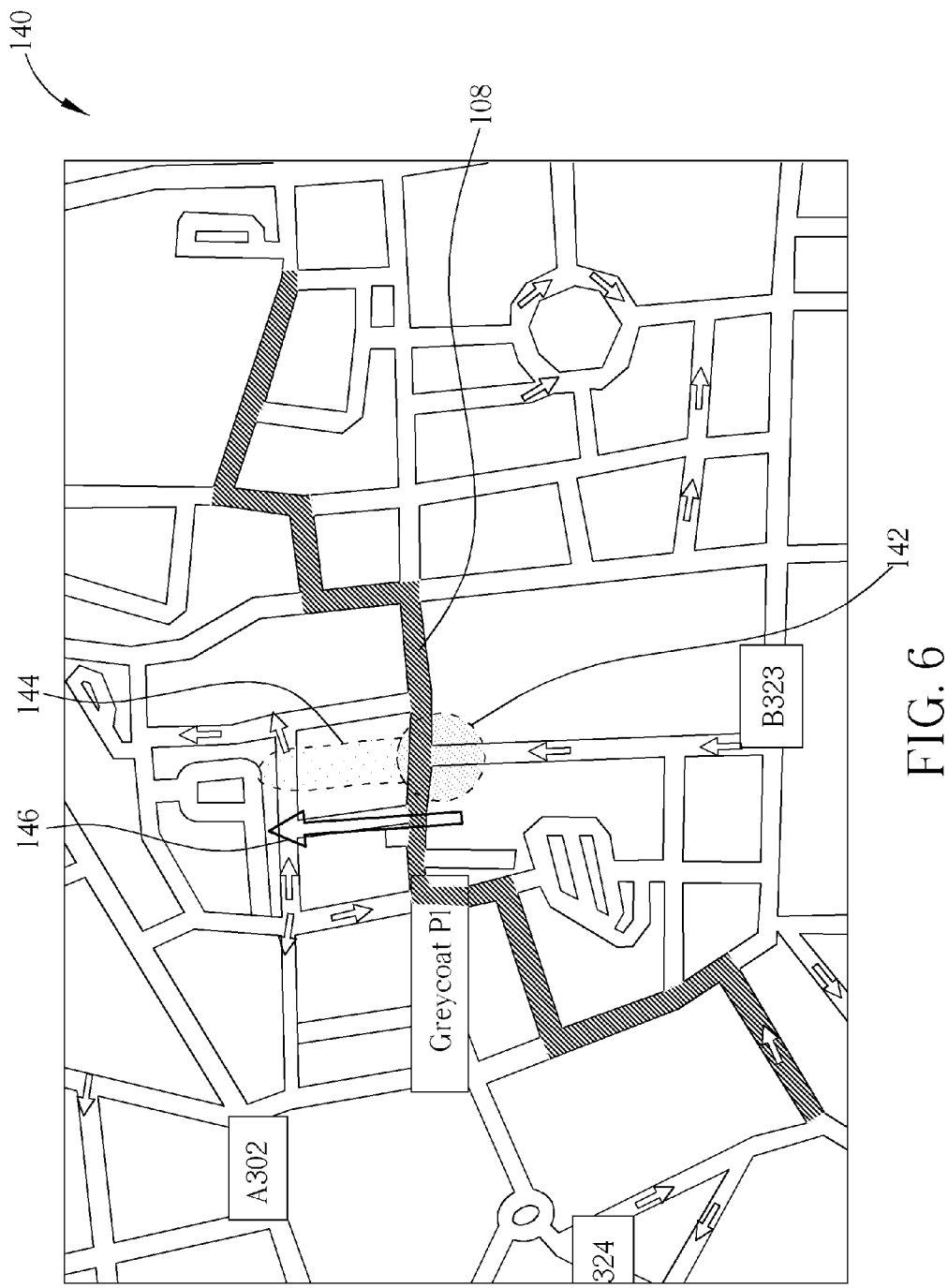
FIG. 6 shows a window in which the user drags a portion of the suggested navigation route in order to modify the suggested navigation route.

Furthermore, once a suggested navigation route has been created, the user can modify the suggested navigation route as desired. Please refer to FIG. 6. FIG. 6 shows a window 140 in which the user drags a portion of the suggested navigation route 108 in order to modify the suggested navigation route 108. As shown in FIG. 6, the user can contact the touch-sensitive screen 12 at a touch-down location 142 and stroke the touch-sensitive screen 12 along an adjusting path 144 in a direction indicated by arrow 146.

Figure 7:
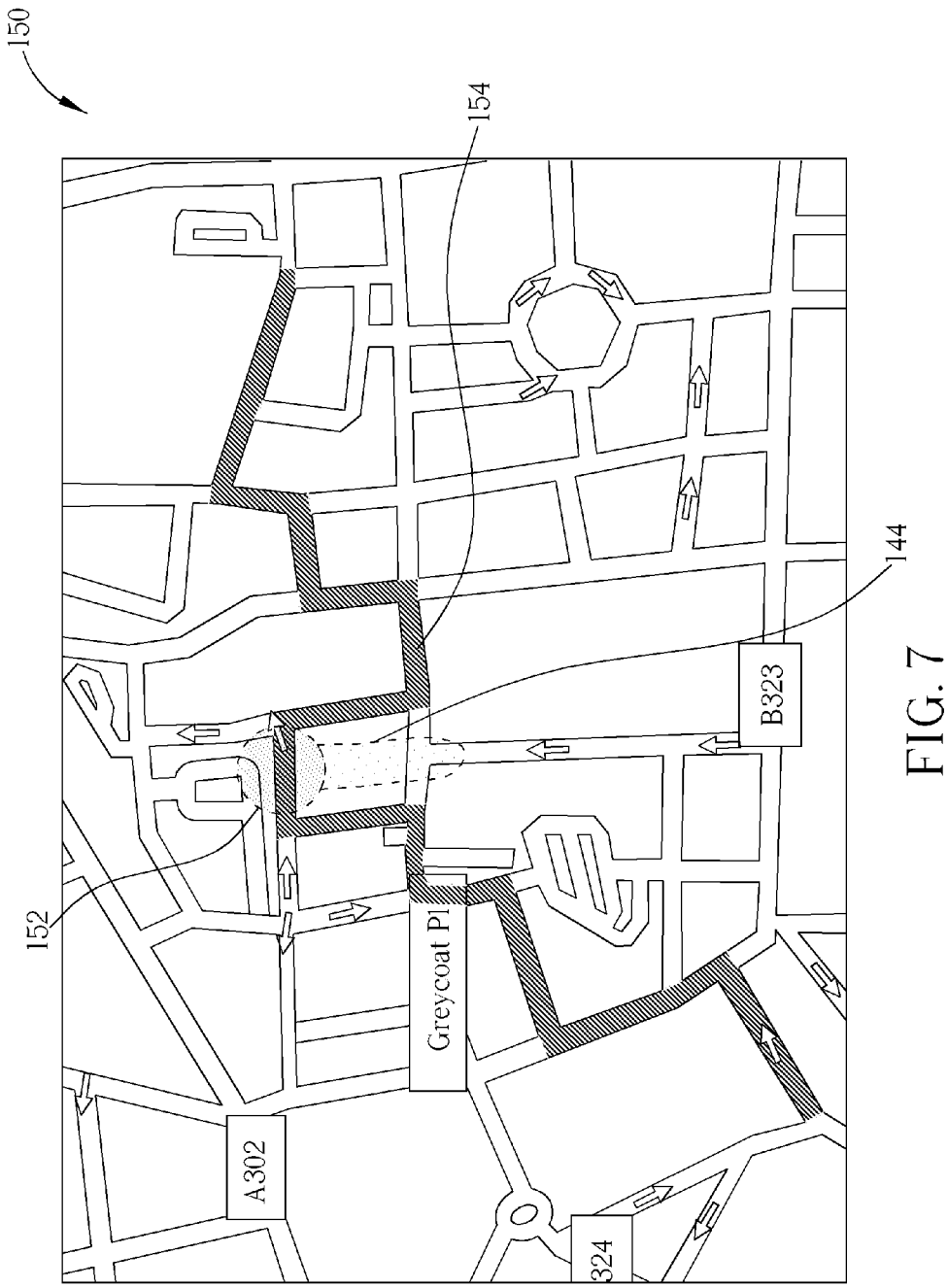
FIG. 7 shows a window in which the suggested navigation route has been modified to create a modified suggested navigation route.

Please refer to FIG. 7. FIG. 7 shows a window 150 in which the suggested navigation route 108 has been modified to create a modified suggested navigation route 154. The adjusting path 144 is terminated when the user releases contact with the touch-sensitive screen 12 at a release location 152. As a result, a portion of the suggested navigation route 108 is moved from a location corresponding to the touch-down location 142 shown in FIG. 6 to a location corresponding to the release location 152 shown in FIG. 7. Therefore, by dragging a portion of the suggested navigation route 108, the user can easily modify the suggested navigation route 108 to create a modified suggested navigation route 154.

In order to create a suggested navigation route based on a preferred route input by a user stroking the touch-sensitive screen 12, the preferred route is first divided into a plurality of vectors that are sequentially located from the starting point to the ending point of the preferred route. Then, for each vector, one or more streets that have traffic flow in a direction nearest a direction of the vector are selected. Additional streets may be selected until the selected streets intersect with the vector.

Figure 8:
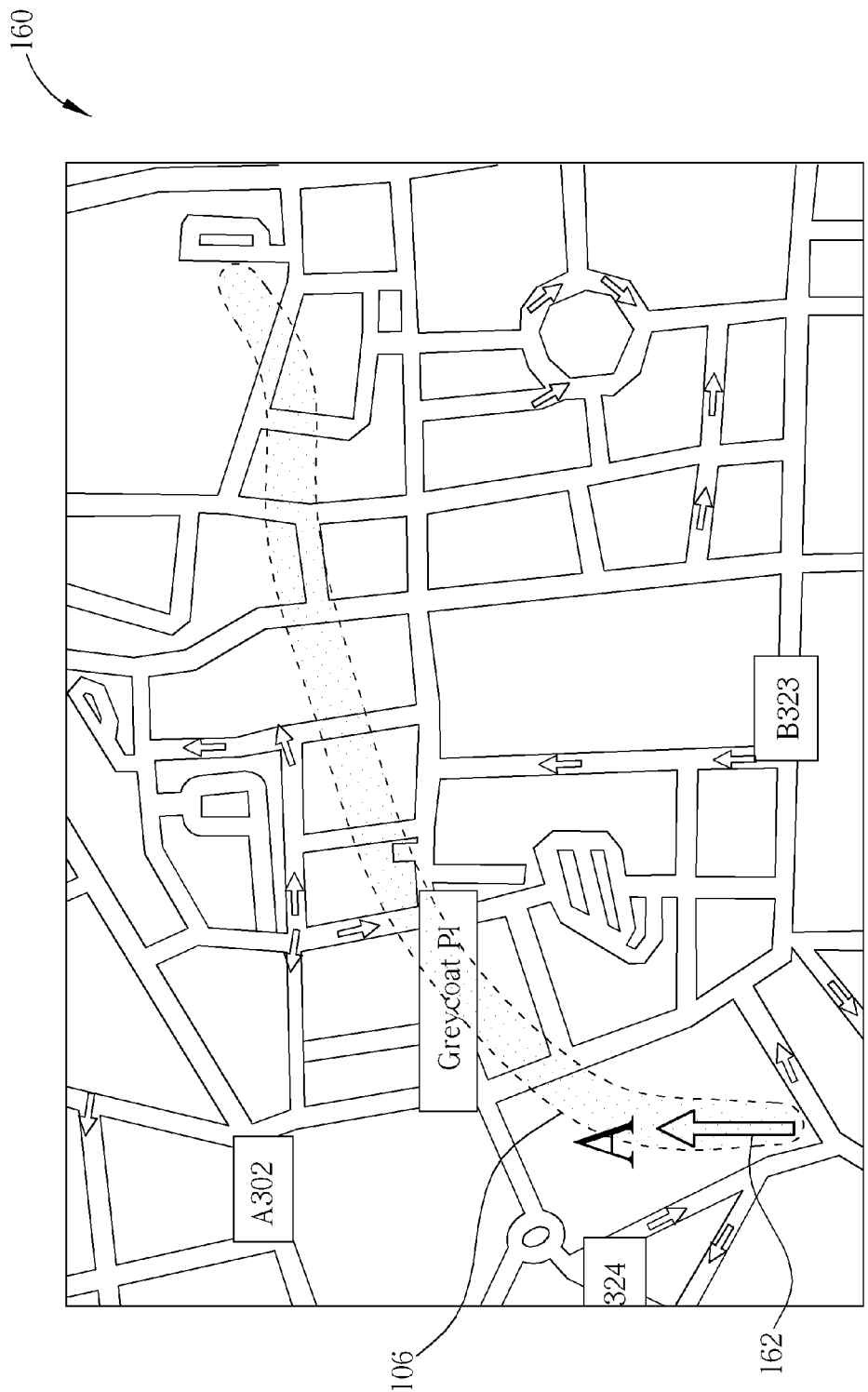
FIG. 8 illustrates a window in which a portion of the preferred route is represented by a vector.

Please refer to FIG. 8. FIG. 8 illustrates a window 160 in which a portion of the preferred route 106 is represented by a vector 162. Since vector 162 is the first vector in the preferred route 106, the vector is labeled as vector A in FIG. 8. As shown, the vector 162 is not located near any streets on the map shown in window 160, so a nearby street will need to be selected when creating a suggested navigation route based on the preferred route 106.

Figure 9:
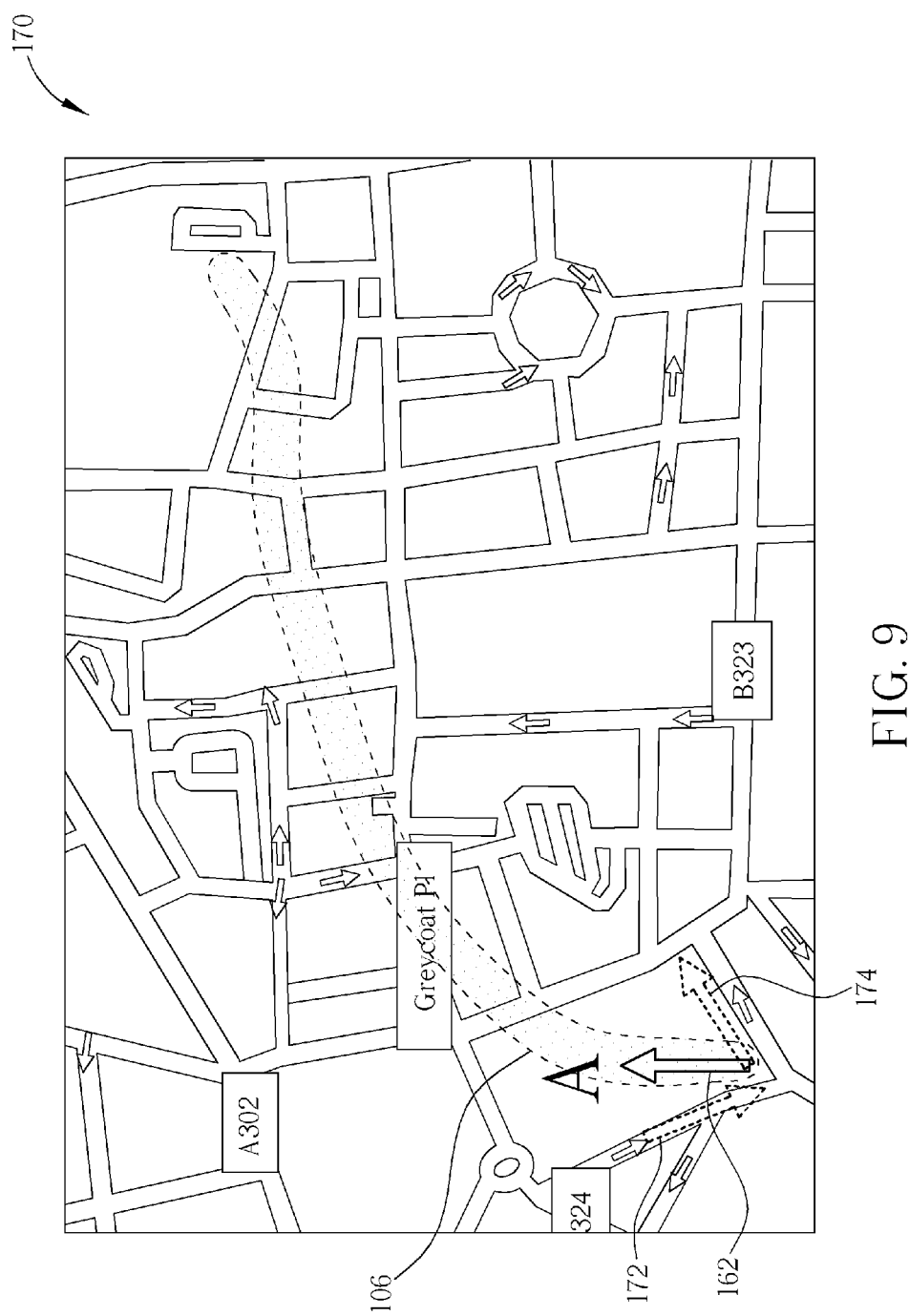
FIG. 9 illustrates a window in which the direction of the vector is matched with the directions of nearby streets.

Please refer to FIG. 9. FIG. 9 illustrates a window 170 in which the direction of the vector 162 is matched with the directions of nearby streets. The vector 162 is located nearby street 172 and street 174. However, the direction of the streets 172 and 174 must be considered. Both of streets 172 and 174 are one-way streets, but the direction of street 172 is mostly opposite the direction of vector 162. As the direction of street 174 is the most similar to the direction of vector 162, street 174 is the best choice for selection in the suggested navigation route.

In general, the streets nearest the vector being considered should serve as potential streets for inclusion in the suggested navigation route. If a potential street is a one-way street, then the one-way street direction should have the same or similar direction as the direction of the vector. If the potential street is not a one-way street, then either direction of the street can be used.

Figure 10:
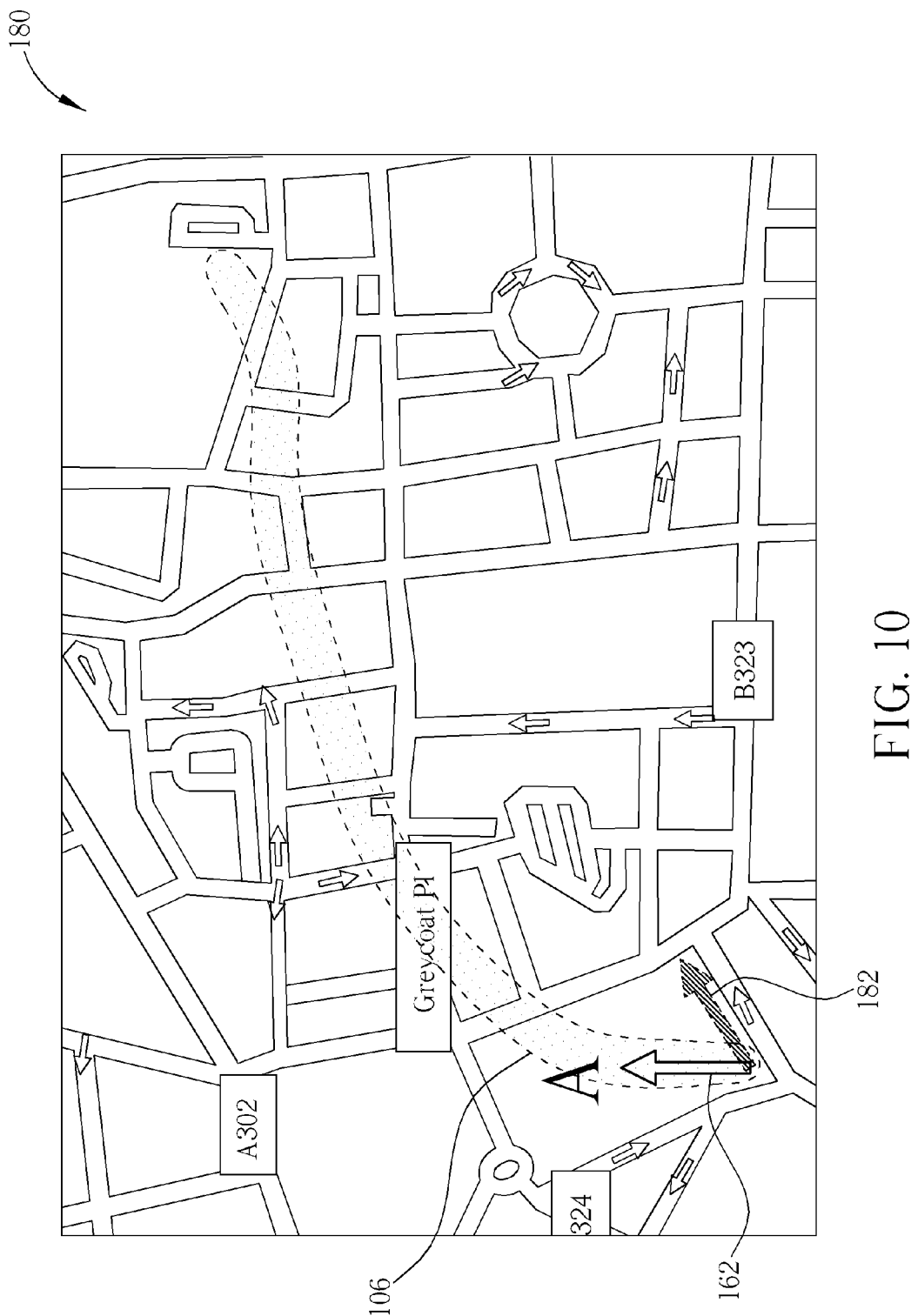
FIG. 10 illustrates a window in which a first segment of the suggested navigation route is created.

Please refer to FIG. 10. FIG. 10 illustrates a window 180 in which a first segment 182 of the suggested navigation route is created. Since in FIG. 9 street 174 was the best choice for inclusion in the suggested navigation route, street 174 is selected as the first segment 182 of the suggested navigation route.

When determining which street should be selected, a quantity that will be referred to as a "product-moment correlation" between the vector 162 and each street direction should be calculated. The product-moment correlation represents a quantity of how well a particular street is correlated with the vector 162 under consideration, which indicates how appropriate the particular street is for inclusion in the suggested navigation route. How well the street direction correlates with the direction of the vector 162 serves as a major factor in determining the product-moment correlation of the street. In addition, each street may have its own weight value assigned to it, with larger streets having larger weight values than smaller streets. An effect of this weighting system is that larger streets are more likely to be "snapped to", or selected for inclusion in the suggested navigation route. Since larger streets have larger weight values than smaller streets, if a user wishes to create a suggested navigation route that does not follow one of the major streets, then the user will have to stroke the touch-sensitive screen 12 more carefully in order to trace a path that uses smaller streets other than the major street. The more closely and carefully the user traces the path to mirror the path of smaller streets, the larger the product-moment correlation of the smaller streets will be, and the more likely the smaller streets will be selected for inclusion in the suggested navigation route.

Figure 11:
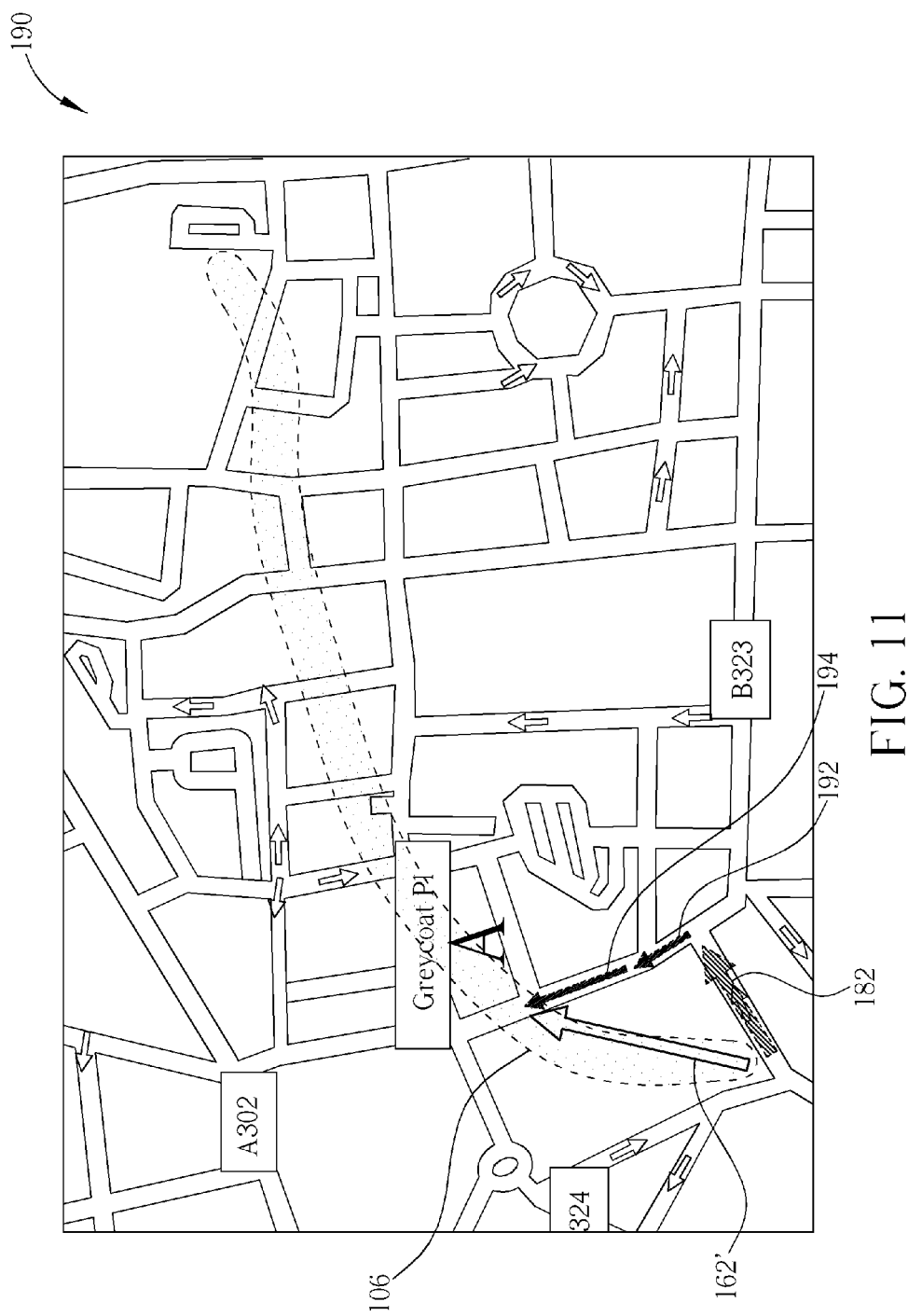
FIG. 11 illustrates a window in which additional segments are selected for inclusion in the suggested navigation route.

Please refer to FIG. 11. FIG. 11 illustrates a window 190 in which additional segments 192 and 194 are selected for inclusion in the suggested navigation route. Since the original vector 162 did not intersect with any of the streets shown on the map, the vector 162 is extended along the preferred route 106 by changing the magnitude and direction of the vector 162 in order to create an updated vector 162'. The updated vector 162' intersects with streets on the map. In addition to the first segment 182 of the suggested navigation route, a second segment 192 and a third segment 194 are selected until the selected segments intersect with the updated vector 162'.

After a first vector, or first updated vector, has been matched with appropriate segments of the suggested navigation route, a new vector is created which originates from a spot on the suggested navigation route where the previous vector ended. In this way, multiple vectors can be used for approximating the preferred route 106 and thereby creating the suggested navigation route using available streets.

The portable electronic device 10 of the present invention may be any device that is capable of providing navigation instructions to a user and that contains a touch-sensitive screen. For instance, the portable electronic device 10 can be a personal navigation device (PND), a mobile phone, a personal digital assistant (PDA), or other similar devices that have at least a position receiving device such as the GPS receiver, a touch-sensitive screen, and a map database.

In summary the present invention provides a quick and simple input method for allowing a user to enter a customized route detailing not only the starting point and the ending point of a preferred route, but also the points along the preferred route located in between the starting point and the ending point. Moreover, after the suggested navigation route is created according to the user's preferred route, the user also has the ability to easily make fine tuning adjustments to the suggested navigation route.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating a suggested navigation route with a portable electronic device, the method comprising:

presenting a map to a user on a touch-sensitive screen of the portable electronic device;

receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point;

generating the suggested navigation route by selecting streets for the suggested navigation route according to the preferred route in order to closely approximate the preferred route;

presenting the suggested navigation route to the user on the touch-sensitive screen; and providing navigation assistance to the user for guiding the user along the suggested navigation route.

2. The method of claim 1, wherein the suggested navigation route is generated according the starting point, the ending point, and points along the preferred route located in between the starting point and the ending point.

3. The method of claim 1, wherein after presenting the suggested navigation route to the user on the touch-sensitive screen, the method further comprises:

the user touching a portion of the suggested navigation route and dragging the portion of the suggested navigation route away from an original position of the portion of the suggested navigation route to create a modified suggested navigation route;

presenting the modified suggested navigation route to the user on the touch-sensitive screen; and providing navigation assistance to the user for guiding the user along the modified suggested navigation route.

4. The method of claim 1, wherein generating the suggested navigation route by selecting streets for the suggested navigation route according to the preferred route comprises:

dividing the preferred route into a plurality of vectors sequentially located from the starting point to the ending point; and for each vector of the plurality of vectors, selecting one or more streets that have traffic flow in a direction nearest a direction of the vector, wherein additional streets are selected until selected streets intersect with the vector.

5. The method of claim 4, wherein when selecting the one or more streets that have traffic flow in the direction nearest the direction of the vector, larger streets are assigned more weight than smaller streets in selection for the suggested navigation route.

6. A portable electronic device for generating a suggested navigation route based on touch input received from a user, the portable electronic device comprising:

a touch-sensitive screen for presenting a map to the user and for receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point;

routing software for generating the suggested navigation route by selecting streets for the suggested navigation route according to the preferred route in order to closely approximate the preferred route; and a user interface for presenting the suggested navigation route to the user on the touch-sensitive screen and providing navigation assistance to the user for guiding the user along the suggested navigation route.

7. The portable electronic device of claim 6, wherein the routing software generates the suggested navigation route according the starting point, the ending point, and points along the preferred route located in between the starting point and the ending point.

8. The portable electronic device of claim 6, wherein after presenting the suggested navigation route to the user on the touch-sensitive screen, the touch-sensitive screen receives input from the user touching a portion of the suggested navigation route and drags the portion of the suggested navigation route away from an original position of the portion of the suggested navigation route to create a modified suggested navigation route, and the user interface presents the modified suggested navigation route to the user on the touch-sensitive screen and provides navigation assistance to the user for guiding the user along the modified suggested navigation route.

9. The portable electronic device of claim 6, wherein when generating the suggested navigation route by selecting streets for the suggested navigation route according to the preferred route, the routing software divides the preferred route into a plurality of vectors sequentially located from the starting point to the ending point, and for each vector of the plurality of vectors, the routing software selects one or more streets that have traffic flow in a direction nearest a direction of the vector, wherein additional streets are selected until selected streets intersect with the vector.

10. The portable electronic device of claim 9, wherein when selecting the one or more streets that have traffic flow in the direction nearest the direction of the vector, the routing software assigns larger streets more weight than smaller streets in selection for the suggested navigation route.

11. The portable electronic device of claim 6 being a personal digital assistant.

12. The portable electronic device of claim 6 being a mobile phone.

13. The portable electronic device of claim 6 wherein the routing software generates the suggested navigation route by selecting streets with higher product-moment correlation with respect to each segment of the preferred route, wherein the product-moment correlation corresponding to each segment of the preferred route is calculated by:

dividing the preferred route into a plurality of vectors respectively corresponding to segments of the preferred route, the vectors sequentially located from the starting point to the ending point; and for each vector of the plurality of vectors, calculating a product-moment correlation for streets located near the corresponding segment of the preferred route, wherein the product-moment correlation value for a street closer in location to the vector and more similar in direction to the vector is higher than the product-moment correlation value for a street farther in location from the vector or more dissimilar in direction to the vector; and a user interface for presenting the suggested navigation route to the user on the touch-sensitive screen and providing navigation assistance to the user for guiding the user along the suggested navigation route.

14. The portable electronic device of claim 13, wherein when calculating a product-moment correlation for a street with respect to each segment of the preferred route, only the one direction that traffic flows in is considered if the street is a one-way street, and both directions that traffic flows in is considered if the street is a two-way street.

15. A method of generating a suggested navigation route with a portable electronic device, the method comprising:

presenting a map to a user on a touch-sensitive screen of the portable electronic device;

receiving touch input from a user stroking the touch-sensitive screen from a touch-down location corresponding to a starting point on the map to a release location corresponding to an ending point on the map for indicating a location of a preferred route, the preferred route beginning with the starting point and finishing with the ending point;

generating the suggested navigation route by selecting streets with higher product-moment correlation with respect to each segment of the preferred route, wherein the product-moment correlation corresponding to each segment of the preferred route is calculated by:

dividing the preferred route into a plurality of vectors respectively corresponding to segments of the preferred route, the vectors sequentially located from the starting point to the ending point; and for each vector of the plurality of vectors, calculating a product-moment correlation for streets located near the corresponding segment of the preferred route, wherein the product-moment correlation value for a street closer in location to the vector and more similar in direction to the vector is higher than the product-moment correlation value for a street farther in location from the vector or more dissimilar in direction to the vector;

presenting the suggested navigation route to the user on the touch-sensitive screen; and providing navigation assistance to the user for guiding the user along the suggested navigation route.

16. The method of claim 15, wherein when calculating a product-moment correlation for a street with respect to each segment of the preferred route, only the one direction that traffic flows in is considered if the street is a one-way street, and both directions that traffic flows in is considered if the street is a two-way street.

* * * * *